United States Patent [19]

Hughes

[11] Patent Number: 5,106,495
[45] Date of Patent: Apr. 21, 1992

[54] PORTABLE WATER PURIFICATION DEVICE

[76] Inventor: Harold Hughes, 2103 E. Concordia Dr., Tempe, Ariz. 85282

[21] Appl. No.: 729,340
[22] Filed: Jul. 12, 1991
[51] Int. Cl.⁵ ............................................ C02F 1/78
[52] U.S. Cl. .................................. 210/139; 210/192; 210/177; 210/202; 210/220; 210/748
[58] Field of Search ............ 210/748, 760, 764, 221.2, 210/220, 139, 192, 202, 177, 134, 103; 261/DIG. 42, 75, 77; 422/28

[56] References Cited

U.S. PATENT DOCUMENTS

| | | | |
|---|---|---|---|
| 2,050,771 | 8/1936 | Wait | 210/760 |
| 3,775,314 | 11/1973 | Beitzel et al. | 210/760 |
| 4,176,061 | 11/1979 | Stopka | 210/760 |
| 4,438,337 | 3/1984 | Forrat | 210/243 |
| 4,640,783 | 2/1987 | Kern | 210/760 |
| 4,719,018 | 1/1988 | Przybylski | 210/143 |
| 4,762,613 | 8/1988 | Snowball | 210/748 |
| 4,857,204 | 8/1989 | Joklik | 210/149 |
| 4,865,749 | 9/1989 | Yoshida | 210/748 |
| 5,024,766 | 6/1991 | Mahmud | 210/748 |

Primary Examiner—Stanley S. Silverman
Assistant Examiner—Cynthia L. Nessler
Attorney, Agent, or Firm—Gregory J. Nelson

[57] ABSTRACT

A portable ozonization system having a tank mounted on a base housing a battery, pump and associated components. A photovoltaic battery charger is mounted on a surface of the tank. Water from the tank is periodically circulated from under the control of a low voltage DC timer by the pump through a venturi where it is subjected to DC generated ultraviolet radiation to treat virus, cysts, bacteria and organic material. Water is withdrawn from the tank for use through a filter to further enhance the water quality.

9 Claims, 2 Drawing Sheets

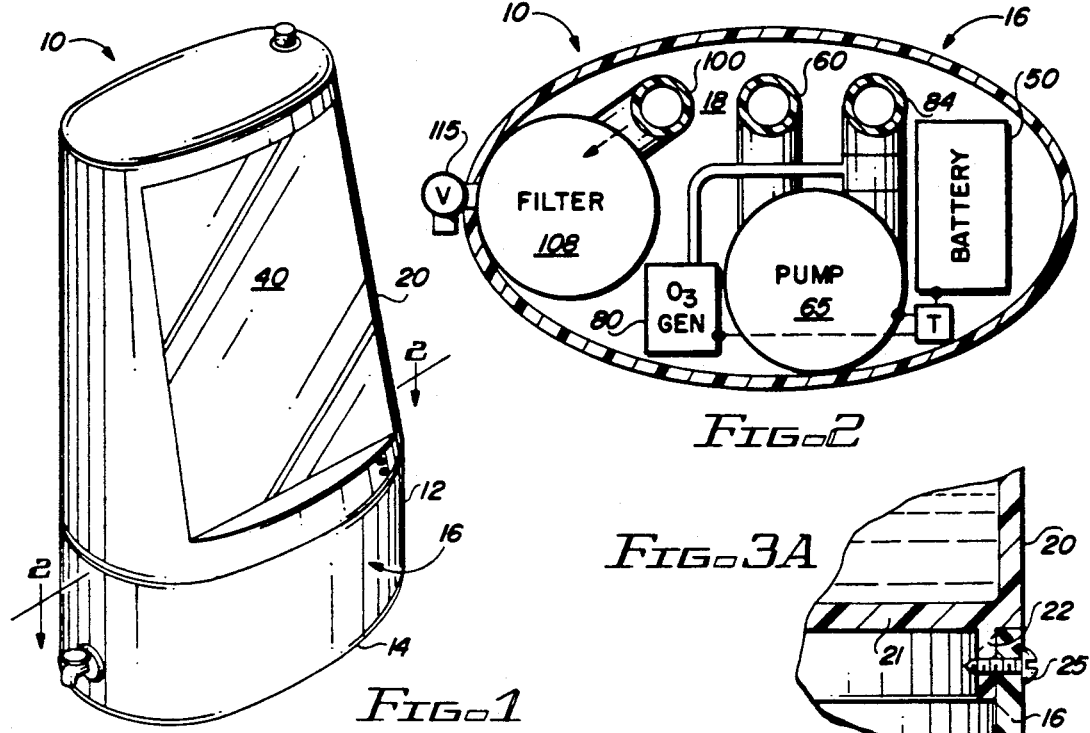
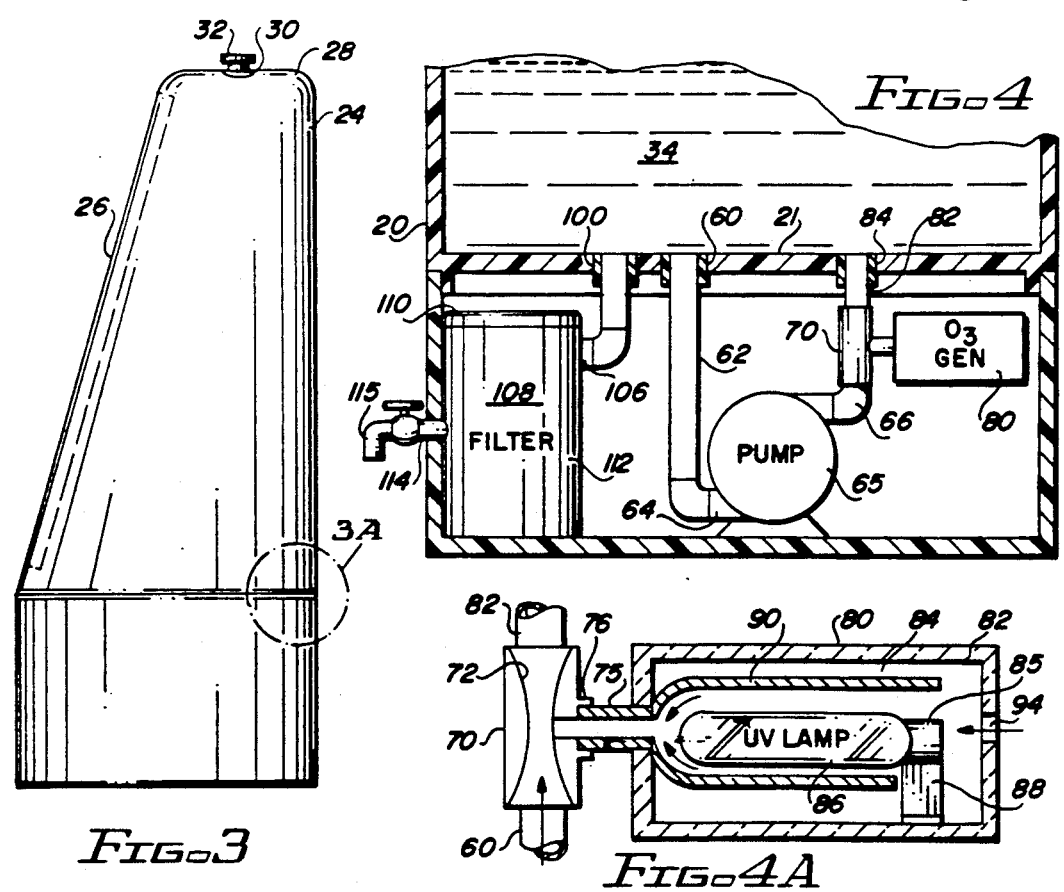

PORTABLE WATER PURIFICATION DEVICE

The present invention relates to a water purification apparatus and more particularly relates to a portable water purifying system that utilizes ozone aspirated into water undergoing treatment as the purifying agent.

The need for portable water treatment systems for providing potable water at remote locations is substantial. This requirement exists, for example, in rural areas where potable water supply is not readily available. Similarly, portable water systems are often required in the aftermath of disasters such as earthquakes and tropical storms where the local water supply has been contaminated or disrupted. Recreational activities such as camping, hunting and the like for extended periods often make it impractical for the participants to carry adequate quantities of potable water. In these situations, some effective method of treating local water supplies becomes necessary.

Various agricultural uses also require a continuous supply of water of uniform quality. For example, animals involved in shows, fairs and racing events need to be assured of water quality and the availability of the portable system to meet this need has been well demonstrated. In addition, there are numerous other industrial and commercial applications for water systems of this type.

A portable water system must be compact and convenient to use. In addition to these requirements, a portable water system must be effective to purify the water and to remove particulates, inorganic materials and hydrocarbons. It is also desirable that such a system not require the addition of chemicals and the like to be added to the water which either may lessen the quality of the treated water or require additional supplies. Thus, a primary criterion for a system of this type is that it be capable of effective unattended operation without the necessity of recharging chemical supplies.

The present system provides a portable system that purifies water by the addition of ozone to the water supply to oxidize contaminants. Ozone is known as nature's natural purifier and it is an unstable form of oxygen designated $O_3$. Ozone is produced from oxygen in the atmosphere reacting to an electrical charge or ultraviolet radiation. It is well known that ozone is created in nature during a thunderstorm particularly at higher altitudes. Ozone is an oxidizing agent and as such is a very effective supplement for conventional chemicals to treat water to significantly reduce undesirable chemical byproducts in the water. Generally, in water treatment systems ozone is generated by means of an ozoning apparatus in which an electrical discharge is passed through an oxygen environment or by ultraviolet light irradiation.

Various ozone/ultraviolet water purification devices can be found in the prior art. For example, U.S. Pat. No. 4,141,830 discloses an apparatus for purifying liquid such as water in which ultraviolet light source irradiates air passing through a chamber surrounding a light source and the air subsequently irradiates liquid passing through a second chamber surrounding the first chamber. The ozonated air is bubbled into the water in the second chamber.

U.S. Pat. No. 3,766,060 shows a rinse water purification system including an ultraviolet light station disposed between wash tanks and a pump with an ion exchange bed and a micron filter disposed between the pump and the wash tanks.

U.S. Pat. No. 4,899,057 shows a sanitary device in which bacteria is reduced by light emitted from diodes powered by a battery. The light emission diode is disposed so as to radiate the inside of a small tank to suppress the proliferation of bacteria.

U.S. Pat. Nos. 4,780,200; 4,297,222; and 4,274,970 are representative of prior art systems disclosing use of ultraviolet light to kill microorganisms in water.

Briefly, the present invention provides a portable water treatment system which utilizes ultraviolet light as a photochemical ozone generator. Power to the present system is provided by a self-contained solar-powered unit with a battery backup. The system includes a housing which contains the battery, pump, ozonator and other components and serves as a base for a holding tank. A surface of the housing or holding tank is preferably configured to serve as a mounting surface for a photovoltaic array. The solar or photovoltaic array charges the battery which serves as the power source for the system. Feed water is periodically charged in the holding tank. The water from the holding tank is circulated by a pump through a venturi and returned to the holding tank. An ozone generator is mounted adjacent the venturi and disassociates oxygen in the ambient air producing low levels of ozone which is aspirated into the circulating water at the venturi. This provides a safe, cost-effective, direct injection of ozone into the water to treat the water. The ozone treatment of the water in the holding tank is periodically repeated and controlled under operation of a timer. The treated water from the holding tank is removed to a point of use through a filter such as a five micron particulate filter in which oxidized organic materials and hydrocarbons are removed. The ozone treatment will effectively treat virus, cysts and bacteria and will also serve to reduce organic material reducing both the COD and BOD in the water. The unit is capable of independent operation and utilizing the battery and photovoltaic cells. The unit will operate for long periods without any appreciable solar radiation. An AC/DC conversion may be desirable in some applications in which an AC plug is connected to the unit and converted to DC power source to charge the storage battery.

The above and other objects and advantages of the present invention will become more apparent from the following description, claims and drawings in which:

FIG. 1 is a perspective view of the portable water system of the present invention showing the base, holding tank and photovoltaic array;

FIG. 2 is a sectional view taken along lines 2—2 of FIG. 1;

FIG. 3 is a side view of the system of FIG. 1;

FIG. 4 is a partial sectional view of the lower portion of the system tank and base;

Figure 5:
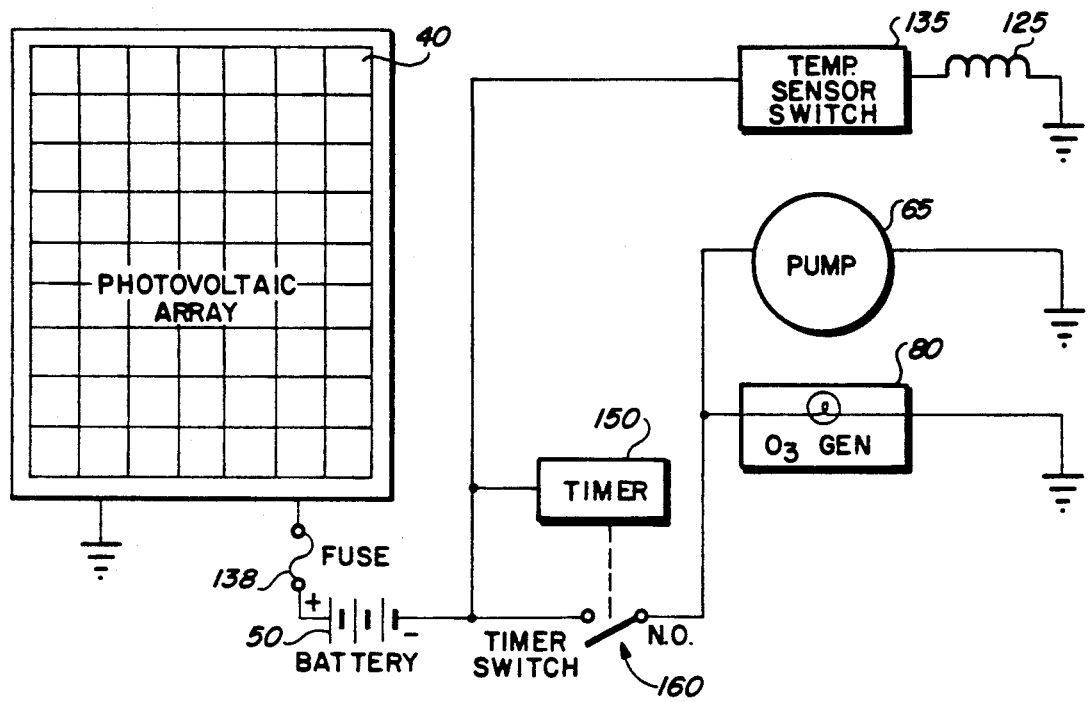
FIG. 5 is a schematic diagram of the components of the water purification system.

Turning now to the drawings, the water treatment unit is generally designated by the numeral 10 and includes a base 12 which is shown as being generally oval in cross section having a bottom 14 and an upstanding side wall 16. As seen in FIGS. 1 and 2, the base defines an enclosure 18 which serves as a housing for containment of certain components of the unit as will be more fully explained hereafter. The base may be of any suitable material but preferably is formed of high density polyethylene or similar material which provides strength, durability and light weight.

A water supply tank 20 is positioned on and extends upwardly from the base. The tank 20 has a bottom 21 with a lip 22 which conforms to the shape of the base and is engageable therein. As seen in FIG. 3A, the base and tank are detachably secured by one or more screws 25 extending from the periphery of the base into lip 22.

The rear of the tank is defined by a vertically upstanding wall 24. The front wall of the tank 26 tapers rearwardly and upwardly to top wall 28. A filler pipe 30 is provided in the top wall having a removable cap 32 so that a supply of water to be treated may be periodically introduced into the interior chamber 34 of the tank.

In normal operation, the portable unit would be positioned with front wall 26 oriented to receive maximum solar energy and the unit may be accordingly positioned with seasonal variations. In some installations, the tank may be enclosed in an exterior housing which will protect the tank and the exterior of the housing will support the solar panel.

A photovoltaic array or solar panel 40 is positioned on the planar portion of front wall 25. Various panels of this general type for converting radiant energy into electricity are available. Solar panels of this type should have high efficiency and durability. One particular solar panel that has been found suitable for this purpose is the light-weight, flexible solar electricity battery charger sold under the trademark "Sunflex MA-10" as manufactured by Sovonics Solar Systems of Troy, Mich. Various capacity units are available but the MA-10 unit provides 12 watts of power with 21.5 V. open circuit voltage and 0.86 amps short circuit current which has been found to be adequate for most applications.

As indicated above, the base 16 houses the other functional components of the system which include a power source 50 which is shown as a deep charge acid lead battery which is operatively connected to the solar cell and is charged by the solar cell across an appropriate voltage regulator. The bottom wall 21 of the water tank is provided with an outlet fitting 60 which is connected by a suitable conduit 62 to the inlet 64 of a water pump 65 positioned within the base enclosure. The water pump 65 can be of various types but is preferably a compact, centrifugal pump operational at 12 volts DC and can be used in open air. A unit of this type which has been found to be adequate is the centrifugal submersible pump Model 1P811A, as manufactured by Teel Water Systems. The discharge from pump 65 is provided at fitting 66 and connected by a short length of conduit 69 to a vertically extending venturi 70.

Venturi 70, as best seen in FIG. 4, has a throat 72 of reduced diameter which creates increased velocity and reduced pressure in the flow through this area. Fitting 75 extends laterally from the throat 72 of the venturi and is connected by a conduit 76 to ozone generator 80. Conduit 76 is preferably of a UV-resistant material such as nylon. The output end of the venturi 70 is connected by conduit 82 to fitting 84 in the bottom wall 21 of the water tank to return water subjected to ozone treatment to the water tank.

The ozone generator 80 is unique in that it operates on DC current and includes a housing 82 which is shown as being generally cylindrical or elliptical in cross section defining an interior chamber 84 having an electrical socket 85 adapted to horizontally position an elongated lamp 86 of the type that produces ultraviolet radiation of a frequency and intensity sufficient to create ozone. A lamp of this type is designated Model FC15T96W, manufactured by Sylvania. The socket has terminals connected to a ballast 88 which ballast is operatively connected to a source of DC power shown as batter 50. Preferably the lamp 86 is generally aligned with fitting 76 so that ozone created by the lamp may be aspirated into the water as it flows through the throat or the venturi. An elliptical or cylindrical shroud 90 may be provided within the housing about the lamp and an air vent 94 provided in the housing. The shroud 90 maintains a predetermined small clearance about the lamp to provide efficient ozone generation.

An outlet fitting 100 is provided in the underside of the tank 20 connected to conduit 104 communicating the water tank with the inlet 106 of filter unit 108. Filter unit 108 is housed within the base of the unit and is of conventional type having a removable head 110 and elongate vertically extending body 112 which receives a suitable filtration cartridge for removing rust, silt, particulates, and taste and odor due to iron, oxidized, inorganic and hydrocarbon ash chlorine and other common chemicals. Typically the cartridge would be made of a cellulose material to collect and remove particles as small as 5 microns. The outlet 114 of the filter is connected by a conduit to a bib 115 extending from the base of the unit from which treated water can be withdrawn.

The DC electrical system is shown in detail in FIG. 5. In addition to the pump an ozone generator, a heating coil 125 may be disposed in the water tank in areas where freezing is a problem. A temperature-sensitive switch 135 is connected to the battery and in the event the temperature drops below a certain level, say 35° F., the switch 135 closes allowing current to flow to the heating coil and maintain the water in the water storage tank at a predetermined temperature. As seen in FIG. 5, the solar panel or charger 40 operates across a fuse 138 and suitable voltage regulator to maintain a suitable charge in the batter 50.

Figure 6:
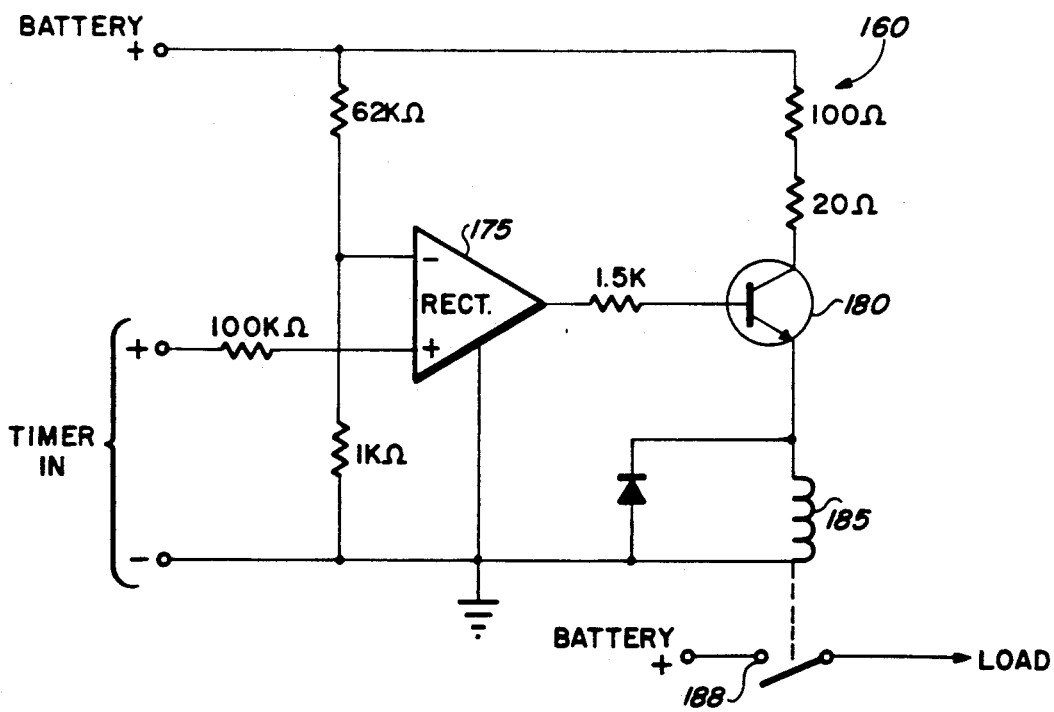
FIG. 6 is a schematic diagram of the timer portion of the electrical system shown in FIG. 5.

The operation of the ozone generator and water pump are controlled across a timer 150 and timer switch 160. The timer 150 is preprogrammed to emit a periodic signal or pulse to the timer switch. The timer switch is shown in FIG. 6 and includes an operational amplifier 175 having infinite input impedance and essentially zero output impedance. Upon receipt of a pulse, the operational amplifier will cause a current flow across transistor 180 through coil 185. The current flow through coil 185 will cause contacts 188 to close, activating the ozone generator 80 and water pump 65. During this time, water is withdrawn from the water tank at outlet 60 through conduit 62 under the influence of pump 65 and returned through the throat 72 of the venturi 70 to the water tank. As the water is drawn through the venturi throat, ozone will be aspirated into the water and accordingly, introduced into the water tank where it will bubble to the surface of the water purifying the water by killing various microorganisms in the water and oxidizing various oxidizable contaminants in the water.

The treatment cycle is continued for a predetermined time until such time as the timer discontinues its operation terminating the electrical signal to the operational amplifier at which time switch 160 will open terminating the operation of the pump an the ozone generator. For most applications, it has been found that periods of 20 minute operation are sufficient if initiated four times during a 24 hour period. The user will periodically add water to the holding tank as water is used and the mixing of the untreated water with the treated water in the tank provides an averaging effect that will render the water drawn from the system potable. Water drawn from the system is further treated in the microfilter which removes particulates and if an activated charcoal element is incorporated in the filter, other contaminants are also removed improving the taste of the water.

In order to test the efficacy of the present unit, a system was constructed as described above having the following components:

Sunflex MA-10, Solar Electric Battery Charger
Tank Capacity-55 Gallons
Pump-Teel Compact Centrifugal Pump Model 1P811A
Filter-Teel 6 G.P.M. Cartridge Filter 5 Micron, Model #1P753-A

TEST

Test Capacity—55 Gallons
Flow Rate—6 GPM
Timer Setting—20 Minutes
Test water drawn from Central Arizona Canal and tested by Analytical Technologies, Inc.
L16 Coliforms
Most Probable Number 100 MLG
After Running Unit 20 Minutes
>2.2 Most Probable Number 100 MLG
Chlorine tested separately, showed significant reduction.

It will be obvious to those skilled in the art to make various changes, alterations and modifications to the water purification apparatus and system described herein. To the extent such changes, alterations and modifications do not depart from the spirit and scope of the appended claims. They are intended to be encompassed therein.

I claim:

1. An apparatus to treat water to reduce microorganisms and other contaminants to an acceptable level comprising:
   (a) a base defining an enclosure for the mechanical and electrical components;
   (b) a holding tank positioned on said base having a first inlet and a first outlet and a second inlet and a second outlet, and having a bottom which conforms to the shape of said base and is engageable therein;
   (c) a solar battery charging array, disposed on an outside wall of said apparatus;
   (d) a battery in said enclosure operatively connected to said battery charging array;
   (e) circulation pump in said enclosure connected between said second outlet and said second inlet;
   (f) venturi means interposed between said pump and said second inlet; and
   (g) ozonation means including a source of UV radiation positioned at said venturi means to cause ozone to be aspirated into the flow of water through the venturi means.

2. The apparatus of claim 1 further including timer means for intermittently operating said pump for predetermined time periods.

3. The apparatus of claim 2 wherein said timer is a low current DC timer.

4. The apparatus of claim 1 wherein said solar battery charging array is located on an inclined mounting surface to expose the array to maximum solar radiation.

5. The apparatus of claim 1 further including a particulate filter connected to said first tank outlet.

6. The apparatus of claim 1 further including a heating means disposed within said tank and a temperature sensor means operatively connected to said heating means to maintain the water at a predetermined temperature.

7. The apparatus of claim 1 wherein said tank and base are high density polyethylene.

8. The apparatus of claim 1 wherein said ozonation means comprises a housing connected to said venturi at a UV-resistant fitting and said source of UV radiation is disposed in said housing and comprises a DC UV lamp operated from said battery.

9. The apparatus of claim 7 in which said lamp iss substantially aligned with said UV-resistant fitting and further includes a shroud at least partially about said lamp to direct radiation to said venturi means.

* * * * *